(No Model.)

J. B. SUTCH & W. C. McELHENY.
NUT LOCK.

No. 291,642. Patented Jan. 8, 1884.

Witnesses.
Louis F. Gardner
J. W. Garner

Inventors
Jno. B. Sutch,
W. C. McElheny,
per
J. A. Lehmann, Atty.

United States Patent Office.

JOHN B. SUTCH AND WILLIAM C. McELHENY, OF PITTSBURG, PA.

NUT-LOCK.

SPECIFICATION forming part of Letters Patent No. 291,642, dated January 8, 1884.

Application filed September 22, 1883. (No model.)

*To all whom it may concern:*

Be it known that we, JOHN B. SUTCH and WILLIAM C. MCELHENY, citizens of the United States, residing at Pittsburg, in the county of Allegheny and State of Pennsylvania, have invented certain new and useful Improvements in Devices for Locking Nuts, of which the following is a specification, reference being had therein to the accompanying drawings.

Our invention relates to an improvement in devices for locking nuts; and it consists in additions to a device for which Letters Patent, No. 257,782, dated May 9, 1882, were granted to JOHN B. SUTCH.

This invention is an improvement on the device for locking nuts as described and claimed in the specification of the said patent; and it consists in an addition of one or more pointed projections at the under side of the open ring serving as washer between the nut and the subjacent surface, to better secure the washer against turning or being pushed out of place either while the nut is being screwed down upon it or afterward by any strain or jar that may be brought against it. This device is chiefly intended to secure nuts on bolts that confine the ends of iron or steel rails between plates, but may be used on bridges, buildings, and for other purposes.

The following is a description of our invention, reference being had therein to the accompanying drawings, in which—

Figure 1:
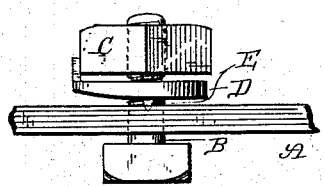
Figure 2:
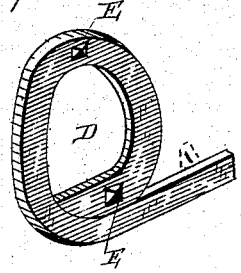

Figure 1 is an edge view of a fish-bar with a bolt, nut, and one of our washers attached thereto, the nut not being screwed down into place. Fig. 2 is a detailed perspective view of the locking-washer.

A represents a fish-bar or plate placed on the web of railroad-rails to hold their adjoining ends in their proper position. In the fish-bars are holes for bolts B to pass through from the opposite side, and on the protruding threaded ends of the bolts nuts C are screwed to hold the fish bars or plates firmly against the ends of the rails, so as to rigidly confine them. In order to prevent the nuts from turning back or losing their hold from the frequent and violent jarrings of the rails when cars pass over them, we place a washer, consisting of an open steel ring, D, upon the protruding end of the bolt, between the nut and the fish-bar. This washer or steel ring is open and of a dimension to fit loosely on the bolt, and one end of it tangentially overlaps the other. At the under side of the ring or washer D, the side in contact with the fish-plate or underlying surface, we make two or more pointed projections, E, opposite to each other, which projections, when the nut is screwed down, are forced into the surface underneath to prevent the turning of the washer. The outer end of the ring or washer D, protruding from under the nut after the nut has been securely screwed down, is to be bent upward at the side of the nut immediately over it. The rigidity of the washer prevents the nut from turning either back or forward as long as the upturned end of the washer remains in this position, forming a perfect lock, so that if the nut is to be turned, it only can be done after the upturned end has been bent to a level with the part of the washer that is under the nut.

In the patent hereinbefore referred to only one projection at the under side of the ring or washer is claimed; but we find that two or more projecting points insure greater security against a displacement. We also find it unnecessary to bevel the under side of the overlapping end of the ring for the introduction of a tool or lever, by which to bend that end upward, since the end of an edge-tool can easily be forced in between the fish-plate and the end of the washer to raise it and lock the nut.

Having thus described our invention, we claim—

A device for locking nuts on bolts, consisting of a bar formed into an open ring or washer, of which one end overlaps the other, the ring to be placed upon the bolt between the nut and the underlying surface, and having at its under side two or more pointed projections that are forced into the underlying surface during and by the process of screwing down the nut, the overlapping end of the ring, when bent upward, locking the nut, substantially as shown and described.

In testimony whereof we affix our signatures in presence of two witnesses.

JOHN B. SUTCH.
WILLIAM C. McELHENY.

Witnesses:
LOUIS MOESER,
I. E. HIRSCH.